United States Patent
Musgrove et al.

(10) Patent No.: US 12,468,013 B1
(45) Date of Patent: Nov. 11, 2025

(54) COMBINATION DETERMINISTIC AND STOCHASTIC WAVEFORM GENERATOR

(71) Applicant: University of Kansas, Lawrence, KS (US)

(72) Inventors: Cameron Musgrove, Bixby, OK (US); Shannon Blunt, Shawnee, KS (US); William Fowler, Owens Cross Roads, AL (US); Patrick McCormick, Lawrence, KS (US); Jennifer Quirk, Lawrence, KS (US)

( * ) Notice: Subject to any disclaimer, the term of this patent is extended or adjusted under 35 U.S.C. 154(b) by 381 days.

(21) Appl. No.: 18/098,185

(22) Filed: Jan. 18, 2023

(51) Int. Cl.
  *G01S 7/36* (2006.01)
  *G01S 7/02* (2006.01)
  *G01S 7/282* (2006.01)
  *G01S 13/28* (2006.01)

(52) U.S. Cl.
  CPC ........... *G01S 7/36* (2013.01); *G01S 7/021* (2013.01); *G01S 7/282* (2013.01); *G01S 13/284* (2013.01)

(58) Field of Classification Search
  CPC . G01S 7/36; G01S 7/021; G01S 7/282; G01S 13/284
  See application file for complete search history.

(56) References Cited

U.S. PATENT DOCUMENTS

| | | | | |
|---|---|---|---|---|
| 5,029,509 | A  * | 7/1991  | Serra | G10H 1/125 84/625 |
| 9,465,098 | B2 | 10/2016 | Ho | |
| 9,559,417 | B1 * | 1/2017  | Schwarzwalder | H01Q 3/2605 |
| 11,307,290 | B2 | 4/2022  | Kim et al. | |
| 2009/0091492 | A1 | 4/2009  | Sanyal et al. | |
| 2020/0184351 | A1 * | 6/2020  | Wang | G01R 23/20 |

* cited by examiner

*Primary Examiner* — William Kelleher
*Assistant Examiner* — Kenneth W Good
(74) *Attorney, Agent, or Firm* — Gerald M. Walsh

(57) ABSTRACT

A combination deterministic and stochastic waveform generator having a waveform generating algorithm for a waveform $s(t)=\exp\{j2\pi[g\int_0^t f_{DET}(\tau)d\tau+h\int_0^t f_{STO}(\tau;x)d\tau]\}$, wherein $f_{DET}(t)$ is a deterministic frequency function of time; wherein $f_{STO}(t;x)$ is a stochastic frequency function of time; wherein $0 \leq g \leq 1$ and $0 \leq h \leq 1$ are relative weighting parameters; wherein $f_{STO}(t;x)$ is parameterized on vector x comprised of a discrete set of random/pseudo-random values to yield a waveform; and wherein, for h and g values in between 0 and 1, the waveform is a combination deterministic and stochastic waveform and is partially Doppler tolerant and resistant to electronic attack. The combination deterministic and stochastic waveform is unique from pulse to pulse, is independent of velocity, can be generated by a standard waveform generator, and can be implemented with a standard modern radar system.

14 Claims, 5 Drawing Sheets

COMBINATION DETERMINISTIC AND STOCHASTIC WAVEFORM GENERATOR

GOVERNMENT INTEREST

This invention was made with government support under contract HQ0860-22-C-7047 with the Missile Defense Agency. The U.S. government has certain rights in the invention.

FIELD

This invention relates to methods and systems for combining deterministic and stochastic waveforms to provide a waveform with the beneficial features of both waveforms.

BACKGROUND

A radar transmits an electromagnetic wave to track a target object and receives an electromagnetic wave reflected from the target. The radar then measures received time, direction, frequency shift, and the like of the reflected electromagnetic wave to detect and track information about the target, such as distance, direction, velocity, etc. Types of radar are broadly divided into a search radar that detects roughly a direction of a target in all directions or a subset of directions over a large range or a tracking radar that continuously and accurately tracks a target in a specific direction. The search radar acquires general information of the target and shares this general information with the tracking radar, while rotating (scanning) a radar beam in all directions or widely. The tracking radar directs a radar beam to the target and tracks the target precisely. The search radar and the tracking radar are operated separately or in combination.

Whenever the radial distance between a moving target and the radar changes with time, the reflected radar signal will exhibit a Doppler frequency shift. Linear frequency modulation waveforms (deterministic waveforms) are suitable for radar search mode because they have a high Doppler tolerance (low detection loss as a function of Doppler frequency offset). However, such waveforms are highly predictable, making them highly susceptible to electronic attack.

Waveforms that are unique from pulse to pulse (stochastic waveforms) have a low Doppler tolerance and have less utility for radar search modes because target velocity must be approximately known to detect the target (high detection loss as a function of Doppler frequency offset). However, stochastic waveforms can be unpredictable (from an outside observer perspective), and provide a degree of covertness and resistance to electronic attack. Combining deterministic and stochastic attributes into a single signal enables the generation of waveforms with the beneficial properties of both types.

SUMMARY

A combination deterministic/stochastic waveform generator is disclosed, having a waveform generator programmed with an algorithm for a waveform $s(t)=\exp\{j2\pi[g\int_0^t f_{DET}(\tau)d\tau + h\int_0^t f_{STO}(\tau; x)d\tau]\}$; wherein $f_{DET}(t)$ is a deterministic frequency function of time; $f_{STO}(t; x)$ is a stochastic frequency function of time; $0 \leq g \leq 1$ and $0 \leq h \leq 1$ are relative weighting parameters. The $f_{STO}(t; x)$ component may be parameterized on vector x comprised of a discrete set of random/pseudo-random values to yield a unique waveform. For h and g values in between 0 and 1, the waveform takes qualities from both deterministic and stochastic signals to yield a waveform that is both partially Doppler tolerant and resistant to electronic attack. The integration stages convert frequency into phase, hence the moniker "phase attached deterministic/random" or PADRa. The stochastic component is unique from pulse to pulse and the combination deterministic/stochastic waveform is independent of velocity.

The degree of Doppler tolerance depends on the relative values of g and h, as these terms weight the relative amount of each component in the resulting PADRa waveform. A nominal case can be considered when $g=1-\alpha$, $h=\alpha$, and $0 \leq \alpha \leq 1$. Other combinations of g and h are possible with varying levels of Doppler tolerance such that an optimal combination can be found for the specific mission and radar parameters. The deterministic waveform may be linear frequency modulated and the stochastic waveform may be random frequency modulated, but each is not limited to these waveforms.

In an alternate embodiment, to enforce a bandwidth limitation on the PADRa waveform, $f_{DET}(t)$ and $f_{STO}(t; x)$ can also be combined according to g and h as $$f_{TOT}(t) = g f_{DET}(t) + h f_{STO}(t). \tag{2}$$

Then $f_{TOT}(t)$ can be limited to a particular band of frequencies by applying the nonlinear clipping operation $C[\cdot]$ via $$f_{FC}(t) = f_{min} \text{ when } f_{TOT}(t) < f_{min}, f_{max} \text{ when } f_{TOT}(t) > f_{max}, \text{ or remain } f_{TOT}(t) \text{ otherwise,} \tag{3}$$

where $f_{min}$ is a minimum frequency limit and $f_{max}$ is a maximum frequency limit. Other frequency limits and functions are possible. Once $f_{FC}(t)$ is computed, a frequency-limited PADRa waveform is formed by $$s'(t) = \exp\{j2\pi \int_0^t f_{FC}(t)d\tau\}$$

which can also be written as $$s'(t) = \exp\{j2\pi \int_0^t C[f_{TOT}(\tau)]d\tau\}. \tag{4}$$

The combination deterministic and stochastic waveform generator may include a plurality of Doppler filter banks in a radar processor to select a target velocity from a span of possible target velocities, while maintaining stochastic waveform characteristics. The radar process could be iterative, following a logic tree to select a next waveform to reduce Doppler tolerance (become more Doppler selective) from a target detection to a track state.

An advantage of the combination deterministic/stochastic waveform is a single waveform type that is useful both for radar searching and tracking and is resistant to electronic attack.

Another advantage is a waveform that can be generated by a standard waveform generator and implemented with a standard modern radar system.

Another advantage is that bandwidth limits can be enforced through modification of the combined frequency function.

DETAILED DESCRIPTION OF THE DISCLOSURE

Figure 1A:
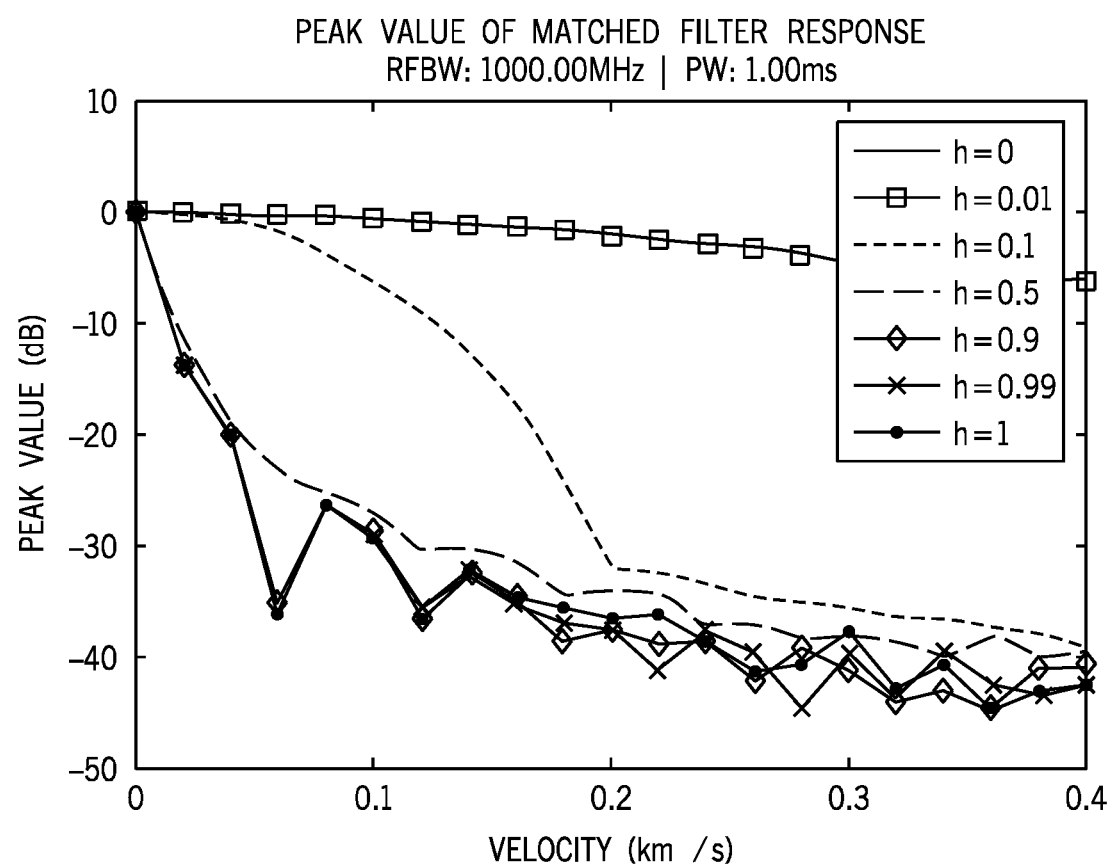
FIG. 1A shows a peak value of a matched filtered response as a function of h and target velocity for a PADRa waveform.

While the following description details certain embodiments of a combination deterministic/stochastic waveform, it is to be understood that the disclosure is not limited in its application to the details in the description of the combination deterministic/stochastic waveform generator, including waveform algorithms and resulting waveforms, since the disclosure is capable of other embodiments and of being practiced in various ways.

Optimizing a waveform for all conditions generally results in a waveform that is not a best choice for any one condition. Waveforms, such as linear frequency modulation (LFM) suitable for radar search mode, have a high Doppler tolerance yet are predictable and do not provide a means to modify their structure from pulse to pulse. Waveforms that are unique from pulse to pulse have a low Doppler tolerance and are inadequate for radar search modes because target velocity must be adequately known to detect the target. Typically, a waveform will fall under one of these two extreme conditions: Doppler tolerant and predictable or Doppler intolerant, selective and unique.

A waveform referred to as phase-attached deterministic/random (PADRa) is disclosed herein, wherein these two conditions can be combined to yield a waveform which is partially Doppler tolerant yet is robust to electronic attack. The waveform is mathematically defined as:

$$s(t) = \exp\{j2\pi[g\int_0^t f_{DET}(\tau)d\tau + h\int_0^t f_{STO}(\tau;x)d\tau]\}, \quad (1)$$

where $f_{DET}(t)$ is the deterministic frequency function of time and $f_{STO}(t; x)$ is the stochastic frequency function of time, with $0 \leq g \leq 1$ and $0 \leq h \leq 1$ the relative weighting parameters. The $f_{STO}(t; x)$ component may be parameterized on vector x comprised of a discrete set of random/pseudo-random values to yield a unique waveform.

To enforce a bandwidth limitation on the PADRa waveform, $f_{DET}(t)$ and $f_{STO}(t; x)$ may be combined according to g and h as $$f_{TOT}(t) = g f_{DET}(t) + h f_{STO}(t). \quad (2)$$

Then $f_{TOT}(t)$ can be limited to a particular band of frequencies by applying the nonlinear clipping operation $C[\cdot]$ via $$f_{FC}(t) = f_{min} \text{ when } f_{TOT}(t) < f_{min}, f_{max} \text{ when } f_{TOT}(t) > f_{max},$$
$$\text{or remain } f_{TOT}(t) \text{ otherwise}, \quad (3)$$

where $f_{min}$ is a minimum frequency limit and $f_{max}$ is a maximum frequency limit. Other frequency limits and functions are possible. Once $f_{FC}(t)$ is computed, a frequency-limited PADRa waveform is formed by $$s'(t) = \exp\{j2\pi\int_0^t f_{FC}(\tau)d\tau\}$$

which can also be written as $$s'(t) = \exp\{j2\pi\int_0^t C[f_{TOT}(\tau)]d\tau\}. \quad (4)$$

PADRa is formed from the phase combination of the deterministic and stochastic waveforms. The phase combination is more clear when (1) is expressed as a phase function expression of the PADRa waveform:

$$s(t) = \exp\{j2\pi[g\int_0^t f_{DET}(\tau)d\tau + h\int_0^t f_{STO}(\tau)d\tau]\},$$

$$s(t) = \exp\{j2\pi[g(1/(2\pi))\phi_{DET}(t) + h1/(2\pi))\phi_{STO}(t; x)]\},$$
or
$$s(t) = \exp\{j[g\phi_{DET}(t) + h\phi_{STO}(t; x)]\}.$$

These series of expressions show that g and h defined for the PADRa waveform in (1) start from the same deterministic/stochastic combination of instantaneous frequency to yield the total $f_{TOT}(\tau)$, though the frequency-limited version in (4) yields a different final waveform with improved spectral containment. When g=1−h, at either extreme (h=0 or h=1) the PADRa waveform is the same as its base deterministic or stochastic waveform (respectively). At h values in between 0 and 1 the waveform takes qualities from both types to yield a waveform that is partially Doppler tolerant and unique pulse to pulse.

Figure 1B:
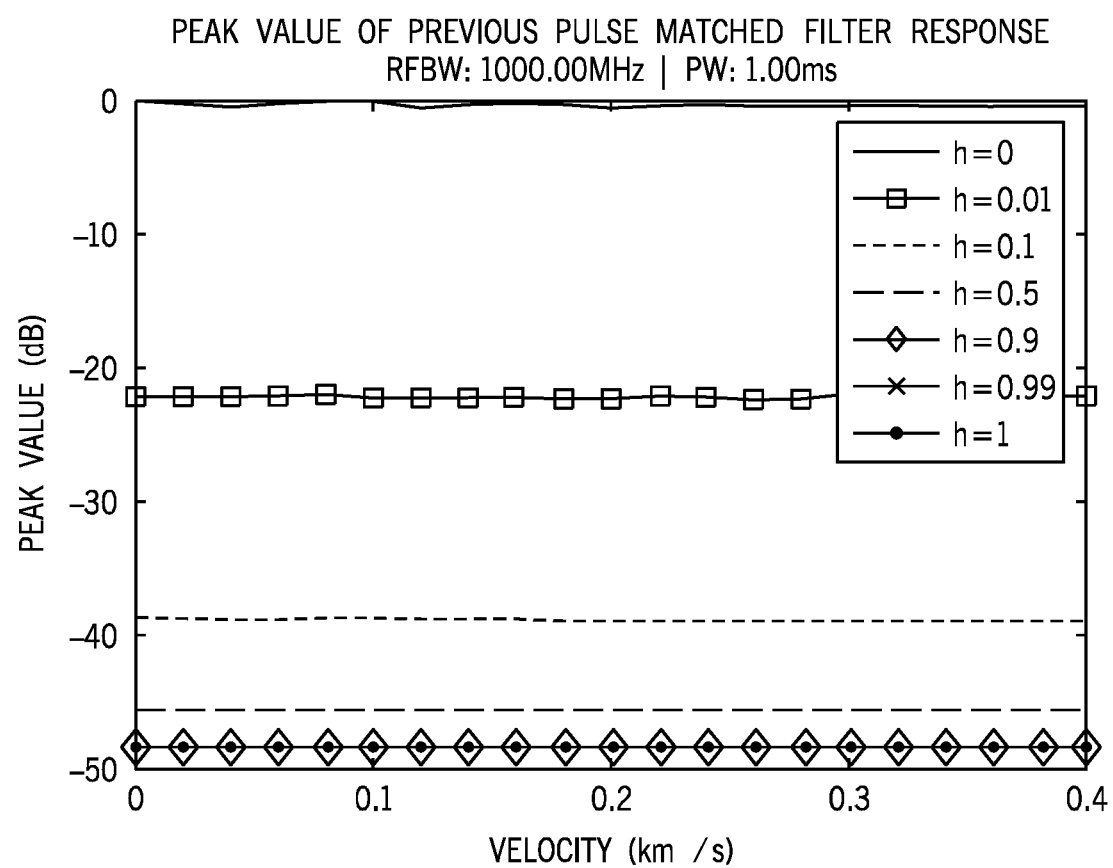
FIG. 1B shows a peak value of previous pulse matched filtered with current pulse as a function of h and target velocity for the PADRa waveform.

FIG. 1A shows a peak value of a matched filtered response as a function of h where g=1−h and target velocity for a PADRa waveform. FIG. 1B shows the peak value of the previous pulse match filtered with the current pulse as a function of h where g=1−h and target velocity for the PADRa waveform. The peak value has no velocity dependence because both pulses have been compensated for the same target velocity. The peak value does depend on h such that with increasing values of h the peak value is less, indicating that there is less correlation between successive pulses. FIG. 1A and FIG. 1B show that at h=0.1 the PADRa waveform has some degree of both Doppler tolerance and uniqueness by cross correlation peak values of nearly −40 dB. Further analysis shows that this performance depends not only on the h value, but the pulse length as well because the pulse length determines the maximum achievable peak-to-average sidelobe ratio as a function of time-bandwidth product.

Figure 2:
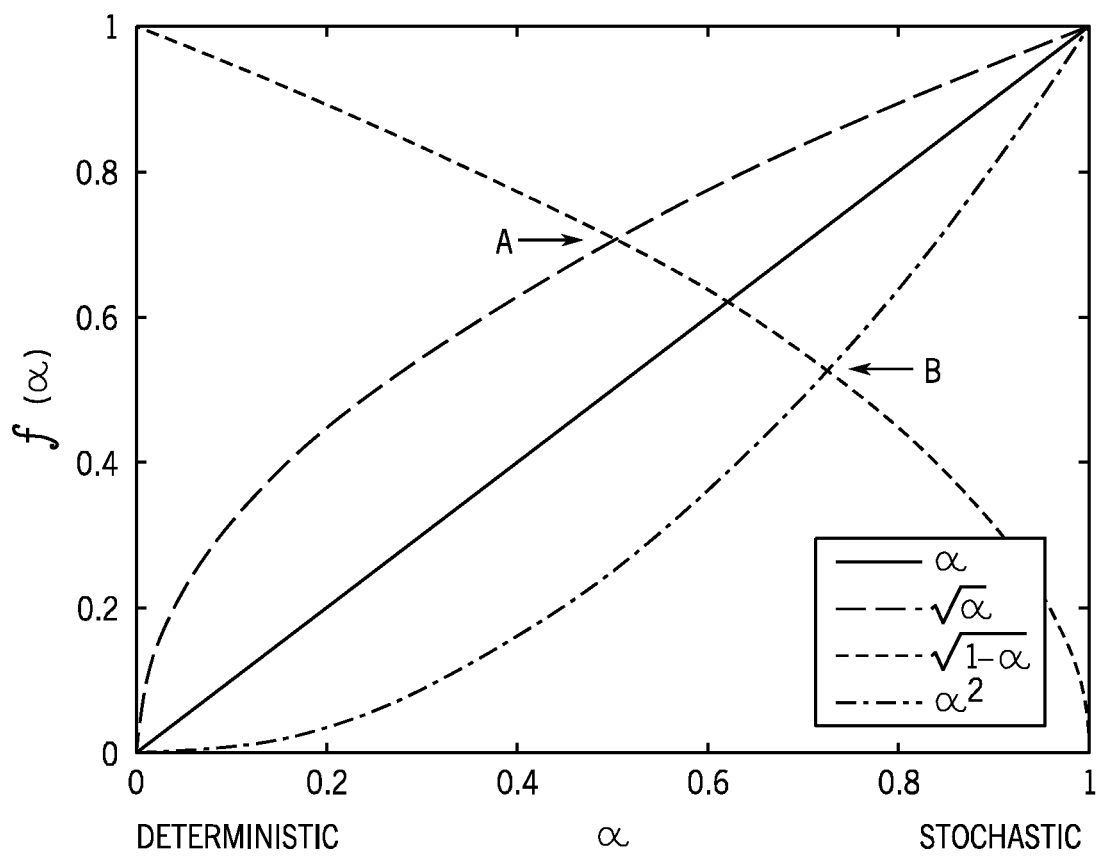
FIG. 2 illustrates possible choices for a function of a to compute weighting factors for deterministic and stochastic waveform components of PADRa.

The values of g and h determine the blending of the waveform features between Doppler tolerance and uniqueness. The terms g and h also scale the waveform bandwidth such that when g=1−α, h=α, and α=0.5, each component has half the desired waveform bandwidth, while the resulting PADRa waveform has more than half the waveform bandwidth but less than the desired, full bandwidth of each component waveform. To gain more bandwidth, the values of g and h can be adjusted. The Doppler tolerance is also affected by the relative weighting of the g and h. This can be visualized in FIG. 2 which illustrates possible choices for a function of a to compute weighting factors for deterministic and stochastic waveform components of PADRa. Point A is one example where the Doppler tolerance is decreased, and the waveform bandwidth is increased over a nominal case where f(α)=α. Point B is another example where Doppler tolerance is increased over the nominal case where f(α)=α.

The values of g and h can be parameterized by function of a where h=α and g=1−α. As α increases from 0 to 1, h increases while g decreases in the same proportion such that when α=0.5 the PADRa waveform has equal contribution from both deterministic and stochastic waveforms. Consider point A (α=0.5) in FIG. 2 arises from selecting g=√(1−α) and h=√(α) where 0<=α<=1 (e.g. √(0.5)=0.7) will yield more bandwidth while reducing the Doppler tolerance over the nominal case because the PADRa waveform has more of the stochastic waveform phase component (area under the √(α) curve) contributing to the total PADRa phase versus the nominal case. Likewise, at point B (α=0.7) in FIG. 2 Doppler tolerance is increased when $g=\sqrt{(1-\alpha)}$ and $h=\alpha^2$ (e.g. 0.5^2=0.25) over the nominal case because the PADRa waveform phase has less contribution from the stochastic waveform relative to the deterministic waveform.

A wide variety of waveforms can be used for the deterministic and stochastic components. The waveforms are not limited to LFM and random FM (RFM) waveforms. The deterministic waveform can be a non-linear frequency modulated waveform. The stochastic waveform could be various forms of binary phase shift keying, including minimum shift keying, frequency shift keying, and other varieties of RFM waveforms. A standard waveform generator can be used to program and create the PADRa waveform disclosed herein. The PADRa waveform can be used with standard modern radar equipment for searching and tracking.

The PADRa waveform mitigates, delays, or prevents interception, detection, and/or identification of a PADRa radar signal by digital radio frequency memory (DRFM)-based interference caused by repeating a radar waveform. The effect of these re-transmitted DRFM signals includes false targets that appear at several range locations within the radar return signal, due to jamming signals that are designed to mimic the radar return of multiple targets at different ranges. For example, bright spots, which generally appear displaced relative to the locations of their respective DRFM sources, appear on the radar image. Through modulation these bright spots can also be made to appear at specific locations in order to cover certain targets within the radar image. However, because of the stochastic component of the PADRa waveform of a return radar signal, repeating a pulse from prior pulse repetition interval by DRFM now becomes impractical and/or not feasible.

Figure 3:
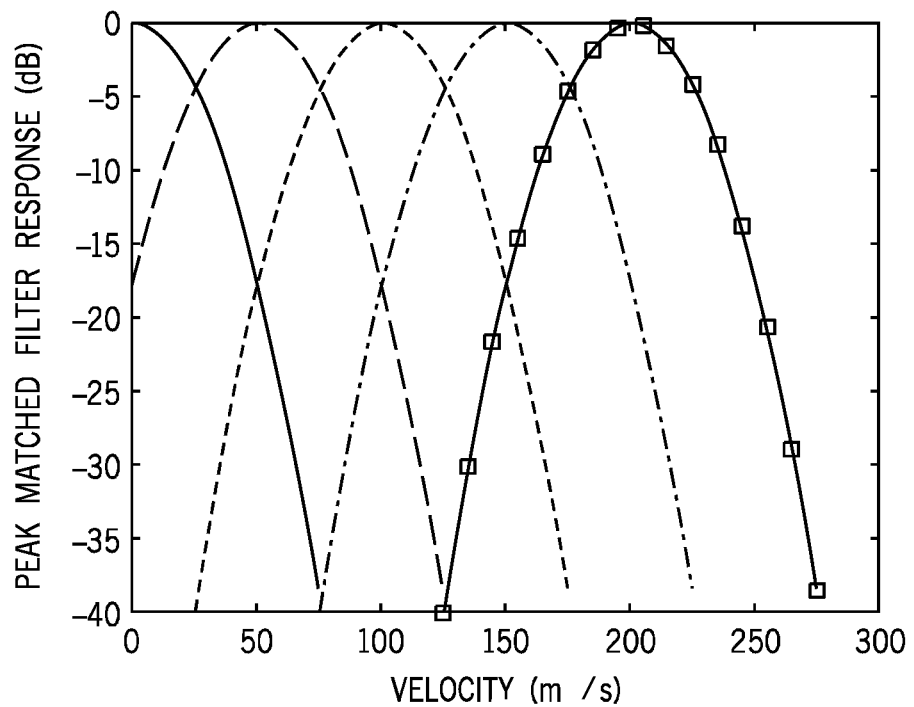
FIG. 3 shows the peak matched filtered response for a PADRa waveform adjusted for five different target velocities (as a Doppler filter bank) to cover a velocity span of 0 to 225 m/s.

Knowing the degree of Doppler tolerance can allow for the radar process to use a finite number of parallel Doppler filter banks to evaluate a span of target velocities while maintaining stochastic attributes for robustness. The radar process could be iterative, following a logic tree to select a next waveform to reduce Doppler tolerance from target detection to track state. For example, in a first step, a radar is engaged in search mode with 5 Doppler filter banks and uses a PADRa waveform with high Doppler tolerance. Each Doppler filter bank covers ⅕ of the target's possible velocity span. FIG. 3 shows the peak matched filtered response for 5 waveforms that cover a velocity span of 0 to 225 m/s.

Figure 4:
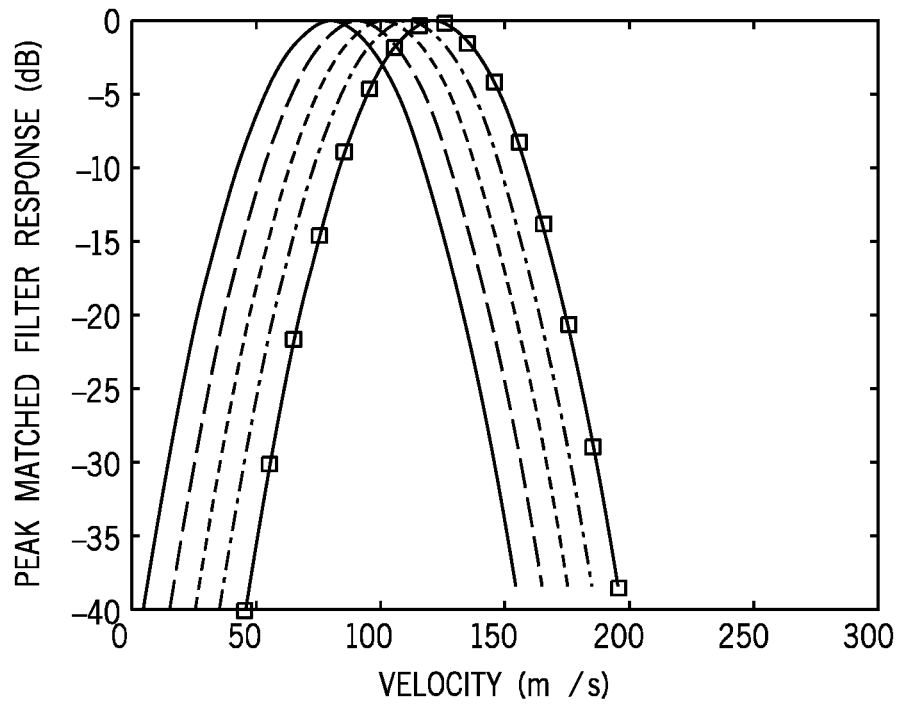
FIG. 4 shows the peak matched filter response for a PADRA waveform that is less Doppler tolerant than in FIG. 3 where five Doppler filter banks are re-tuned to resolve the target velocity near 125 m/s.

In a second step, upon detection in one of the Doppler filters, the next waveform transmitted increases the Doppler selectivity such that all 5 Doppler filter banks are tuned to a narrower range of velocities positioned across the previous filter's velocity span. For example, the target is detected within the 3rd Doppler filter bank at 100 m/s. FIG. 4 shows the five Doppler filter banks re-tuned to resolve the target velocity near 100 m/s.

The second step is repeated until the target's velocity is measured within the required precision to establish and maintain track. There is an exponential increase in the precision of detecting the target velocity with each successive pulse. Pulse 1 reveals the precision of the velocity within ⅕ of the total velocity span of values, the second pulse reveals the velocity within ¹⁄₂₅th of the total velocity span of values, the third pulse reveals the velocity within ¹⁄₁₂₅th of the total velocity span of values.

Figure 5:
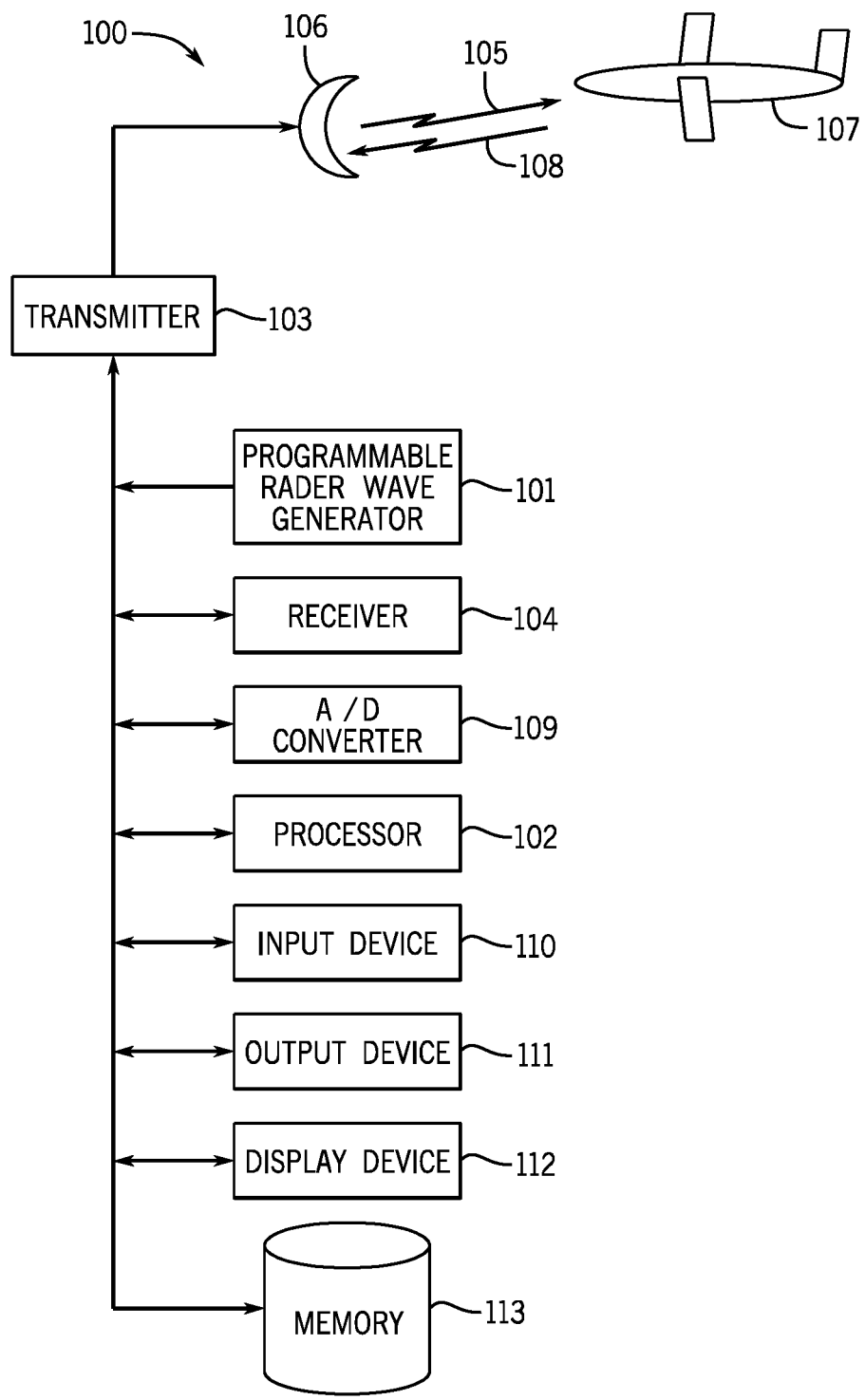
FIG. 5 is a schematic illustration of a radar system.

FIG. 5 is a schematic illustration of a radar system 100. The system 100 includes a programmable radar waveform generator 101, a processor 102 electrically coupled to a radar signal transmitter 103 and a radar signal receiver 104. The processor 102 can be, for example, an aperture imaging processor or other suitable computer processor used in radar systems for controlling operation of a radar system. The transmitter 103 and receiver 104 are coupled to an antenna 106. The programmable waveform generator 101 provides transmission waveforms 105 to the transmitter 103 which are transmitted by the antenna 106. The transmission waveforms 105 (e.g., radar transmission signals) are directed towards a target 107 (e.g., aircraft, satellite, vehicle, boat) to, for example, determine the range and velocity of the target 107 relative to the antenna 106. Return radar waveforms 108 (e.g., radar return signals reflected back towards the antenna 106 in response to the transmission waveforms 105 impinging upon the target 107) are received by the antenna 106. The receiver 104 receives the response signals (i.e., return radar waveforms 108) from the antenna 106 and directs the signals to the processor 102 via an analog-to-digital (A/D) converter 109 to convert the pulses to a digital signal for subsequent processing by the processor 102.

The modules and devices described herein can, for example, utilize the processor 102 to execute computer executable instructions and/or include another processor to execute computer executable instructions (e.g., an encryption processing unit, a field programmable gate array processing unit, etc.). It should be understood that the system 100 can include, for example, other modules, devices, and/or processors known in the art and/or varieties of the illustrated modules, devices, and/or processors.

The input device 110 receives information associated with the system 100 (e.g., instructions from a user, instructions from another computing device) from a user (not shown) and/or another computing system (not shown). The input device 110 can include, for example, a keyboard or a scanner. The output device 111 outputs information associated with the system 100 (e.g., information to a printer (not shown), information to an audio speaker (not shown)).

The display device 112 displays information associated with the system 100 (e.g., status information, configuration information). The processor 102 executes the operating system and/or any other computer executable instructions for the system 100 (e.g., receives return radar waveforms 108 from the antenna 106).

The memory 113 stores various information associated with the system 100 and its operation. The memory 113 can include a plurality of storage devices. The memory 113 can include, for example, long-term storage (e.g., a hard drive, a tape storage device, flash memory, etc.), short-term storage (e.g., a random-access memory, a graphics memory, etc.), and/or any other type of computer readable storage.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments.

What is claimed is:

1. A combination deterministic and stochastic waveform generator system, comprising:
   a) a computer processor coupled to a radar signal transmitter and a radar signal receiver wherein the transmitter and receiver are coupled to an antenna; and
   b) a waveform generating algorithm for a waveform $s(t)=\exp\{j2\pi[g\int_0^t f_{DET}(\tau)d\tau+h\int_0^t f_{STO}(\tau; x)d\tau]\}$, wherein $f_{DET}(t)$ is a deterministic frequency function of time;
   wherein $f_{STO}(t; x)$ is a stochastic frequency function of time;
   wherein $0 \leq g \leq 1$ and $0 \leq h \leq 1$ are relative weighting parameters;
   wherein $f_{STO}(t; x)$ is parameterized on vector x comprised of a discrete set of random/pseudo-random values to yield a waveform; and
   wherein, for h and g values in between 0 and 1, the waveform is a combination deterministic and stochastic waveform and is partially Doppler tolerant and resistant to electronic attack;
   wherein the waveform generator system provides the waveform generated by the waveform generating algorithm to the transmitter, wherein said waveform is transmitted to the antenna and to the target and
   wherein said waveform is reflected back from the target to the antenna and directed to the receiver and to the processor.

2. A combination deterministic and stochastic waveform generator system of claim 1 wherein the values of g and h are parameterized by function of α where h=α and g=1−α and as a increases from 0 to 1, h increases while g decreases in the same proportion such that when α=0.5 the waveform has equal contribution from both deterministic and stochastic waveforms.

3. A combination deterministic and stochastic waveform generator system of claim 1 wherein the deterministic and stochastic waveform is independent of velocity.

4. A combination deterministic and stochastic waveform generator system of claim 1, wherein the deterministic waveform is linear frequency modulated and the stochastic waveform is random frequency modulated.

5. A combination deterministic and stochastic waveform generator system of claim 1, further comprising a bandwidth limitation formed on the waveform by combining $f_{DET}(t)$ and $f_{STO}(t; x)$ according to g and h as $f_{TOT}(t)=gf_{DET}(t)+hf_{STO}(t)$, wherein $f_{TOT}(t)$ is limited to a particular band of frequencies by applying nonlinear clipping via $f_{FC}(t)=f_{min}$ when $f_{TOT}(t)<f_{min}$, $f_{max}$ when $f_{TOT}(t)>f_{max}$, or remain $f_{TOT}(t)$ otherwise,
   wherein $f_{min}$ is a minimum frequency limit and $f_{max}$ is a maximum frequency limit and wherein $f_{FC}(t)$ is computed and a frequency-limited waveform is formed by $s'(t)=\exp\{j2\pi\int_0^t f_{FC}(\tau)d\tau\}$ or $s'(t)=\exp\{j2\pi\int_0^t C[f_{TOT}(\tau)]d\tau\}$.

6. A combination deterministic and stochastic waveform generator system of claim 1 further comprising a plurality of Doppler filter banks in a radar processor to select a target velocity from a span of possible target velocities, while maintaining stochastic waveform characteristics.

7. A combination deterministic and stochastic waveform generator system of claim 1, wherein the deterministic and stochastic waveform generator radar process is an iterative process, following a logic tree to select a next waveform to reduce Doppler tolerance from a target detection state to a track state.

8. A combination deterministic and stochastic waveform generator system, comprising:
   a) a computer processor coupled to a radar signal transmitter and a radar signal receiver wherein the transmitter and receiver are coupled to an antenna; and
   b) a waveform generating algorithm for a waveform $s(t)=\exp\{j2\pi[g\int_0^t f_{DET}(\tau)d\tau+h\int_0^t f_{STO}(\tau; x)d\tau]\}$, wherein $f_{DET}(t)$ is a deterministic frequency function of time;
   wherein $f_{STO}(t; x)$ is a stochastic frequency function of time;
   wherein $0 \leq g \leq 1$ and $0 \leq h \leq 1$ are relative weighting parameters;
   wherein $f_{STO}(t; x)$ is parameterized on vector x comprised of a discrete set of random/pseudo-random values to yield a waveform;
   wherein, for h and g values in between 0 and 1, the waveform is a combination deterministic and stochastic waveform and is partially Doppler tolerant and resistant to electronic attack;
   wherein the waveform generator system provides the waveform generated by the waveform generating algorithm to the transmitter, wherein said waveform is transmitted to the antenna and to the target and
   wherein said waveform is reflected back from the target to the antenna and directed to the receiver and to the processor
   wherein the values of g and h are parameterized by function of a where h=α and g=1−α and as α increases from 0 to 1, h increases while g decreases in the same proportion such that when α=0.5 the waveform has equal contribution from both deterministic and stochastic waveforms; and
   wherein the deterministic and stochastic waveform is independent of velocity.

9. A combination deterministic and stochastic waveform generator system of claim 8, wherein the deterministic waveform is linear frequency modulated and the stochastic waveform is random frequency modulated.

10. A combination deterministic and stochastic waveform generator system of claim 8, further comprising a bandwidth limitation formed on the waveform by combining $f_{DET}(t)$ and $f_{STO}(t; x)$ according to g and h as $f_{TOT}(t)=gf_{DET}(t)+hf_{STO}(t)$, wherein $f_{TOT}(t)$ is limited to a particular band of frequencies by applying nonlinear clipping via $f_{FC}(t)=f_{min}$ when $f_{TOT}(t)<f_{min}$, $f_{max}$ when $f_{TOT}(t)>f_{max}$, or remain $f_{TOT}(t)$ otherwise,
   wherein $f_{min}$ is a minimum frequency limit and $f_{max}$ is a maximum frequency limit and wherein $f_{FC}(t)$ is computed and a frequency-limited waveform is formed by $s'(t)=\exp\{j2\pi\int_0^t f_{FC}(\tau)d\tau\}$ or $s'(t)=\exp\{j2\pi\int_0^t C[f_{TOT}(\tau)]d\tau\}$.

11. A combination deterministic and stochastic waveform generator of claim 8 further comprising a plurality of Doppler filter banks in a radar processor to select a target velocity from a span of possible target velocities, while maintaining stochastic waveform characteristics.

12. A combination deterministic and stochastic waveform generator of claim 8, wherein the deterministic and stochastic waveform generator radar process is an iterative process, following a logic tree to select a next waveform to reduce Doppler tolerance from a target detection state to a track state.

13. A combination deterministic/stochastic waveform generator system, comprising:
 1. a) a computer processor coupled to a radar signal transmitter and a radar signal receiver wherein the transmitter and receiver are coupled to an antenna; and
 b) a waveform generating algorithm for a waveform $$s(t)=\exp\{j2\pi[g\int_0^t f_{DET}(\tau)d\tau + h\int_0^t f_{STO}(\tau; x)d\tau]\},$$

wherein $f_{DET}(t)$ is a deterministic frequency function of time;
 wherein $f_{STO}(t; x)$ is a stochastic frequency function of time;
 wherein $0 \leq g \leq 1$ and $0 \leq h \leq 1$ are relative weighting parameters;
 wherein $f_{STO}(t; x)$ is parameterized on vector x comprised of a discrete set of random/pseudo-random values to yield a waveform;
 wherein, for h and g values in between 0 and 1, the waveform is a combination deterministic and stochastic waveform and is partially Doppler tolerant and resistant to electronic attack;
 wherein the waveform generator system provides the waveform generated by the waveform generating algorithm to the transmitter, wherein said waveform is transmitted to the antenna and to the target and
 wherein said waveform is reflected back from the target to the antenna and directed to the receiver and to the processor wherein the values of g and h are parameterized by function of a where h=α and g=1−α and ss α increases from 0 to 1, h increases while g decreases in the same proportion such that when α=0.5 the waveform has equal contribution from both deterministic and stochastic waveforms;
 wherein the deterministic and stochastic waveform is independent of velocity; and
 wherein the deterministic waveform is linear frequency modulated and the stochastic waveform is random frequency modulated; and
 2) a bandwidth limitation formed on the waveform by combining $f_{DET}(t)$ and $f_{STO}(t; x)$ according to g and h as $$f_{TOT}(t) = g f_{DET}(t) + h f_{STO}(t),$$

wherein $f_{TOT}(t)$ is limited to a particular band of frequencies by applying nonlinear clipping via $f_{FC}(t) = f_{min}$ when $f_{TOT}(t) < f_{min}$, $f_{max}$ when $f_{TOT}(t) > f_{max}$, or remain $f_{TOT}(t)$ otherwise, and
 wherein $f_{min}$ is a minimum frequency limit and $f_{max}$ is a maximum frequency limit and wherein $f_{FC}(t)$ is computed and a frequency-limited waveform is formed by $$s'(t) = \exp\{j2\pi \int_0^t f_{FC}(\tau)d\tau\}$$

or $$s'(t) = \exp\{j2\pi \int_0^t C[f_{TOT}(\tau)]d\tau\}.$$

14. A combination deterministic and stochastic waveform generator system of claim 13, further comprising a plurality of Doppler filter banks in a radar processor to select a target velocity from a span of possible target velocities, while maintaining stochastic waveform characteristics, wherein the deterministic and stochastic waveform generator radar process is an iterative process, following a logic tree to select a next waveform to reduce Doppler tolerance from a target detection state to a track state.

* * * * *